United States Patent
Bertin

(10) Patent No.: US 9,505,501 B2
(45) Date of Patent: Nov. 29, 2016

(54) DEVICE FOR GENERATING A LIGHT BEAM WITH THREE OR MORE SECTORS FOR A GLIDE ANGLE INDICATOR FOR AIRCRAFT AND A GUIDE ANGLE INDICATOR COMPRISING THE DEVICE

(71) Applicant: CALZONI S.R.L., Calderara di Reno (Bologna) (IT)

(72) Inventor: Daniele Maria Bertin, Milan (IT)

(73) Assignee: CALZONI S.R.L., Calderara di Reno (IT)

( * ) Notice: Subject to any disclaimer, the term of this patent is extended or adjusted under 35 U.S.C. 154(b) by 434 days.

(21) Appl. No.: 14/102,932

(22) Filed: Dec. 11, 2013

(65) Prior Publication Data

US 2014/0168609 A1      Jun. 19, 2014

(30) Foreign Application Priority Data

Dec. 18, 2012   (IT) .............................. BO2012A0684

(51) Int. Cl.
*B64D 45/00*     (2006.01)
*B64F 1/20*      (2006.01)

(52) U.S. Cl.
CPC .................. *B64D 45/00* (2013.01); *B64F 1/20* (2013.01); *B64D 2203/00* (2013.01)

(58) Field of Classification Search
CPC ........ B64F 1/20; G64F 1/00; B64D 2203/00

USPC ....................................................... 353/20, 14
See application file for complete search history.

(56) References Cited

FOREIGN PATENT DOCUMENTS

| EP | 1547922 | * 6/2005 | ............... B64F 1/20 |
|----|---------|----------|--------------------------|
| EP | 2261122 | 12/2010  |                          |
| EP | 2325085 | 5/2011   |                          |
| EP | 2495169 | 9/2012   |                          |
| GB | 891982  | 3/1962   |                          |

OTHER PUBLICATIONS

Italian Search Report dated Jul. 2, 2013 from counterpart app BO20120684.

* cited by examiner

*Primary Examiner* — Steven H. Whitesell Gordon
*Assistant Examiner* — Jerry Brooks
(74) *Attorney, Agent, or Firm* — Shuttleworth & Ingersoll, PLC; Timothy J. Klima

(57) ABSTRACT

An air intake device for a submarine comprises a first fixed member connected to the submarine hull and a second member which is telescopically movable relative to the first member to rise up with an upper end of it above the water's surface to allow air to be taken in from the atmosphere during navigation of the submarine at periscope depth, the movable member mounting at its upper end a radar device designed to emerge from the water together with the selfsame movable member.

15 Claims, 4 Drawing Sheets

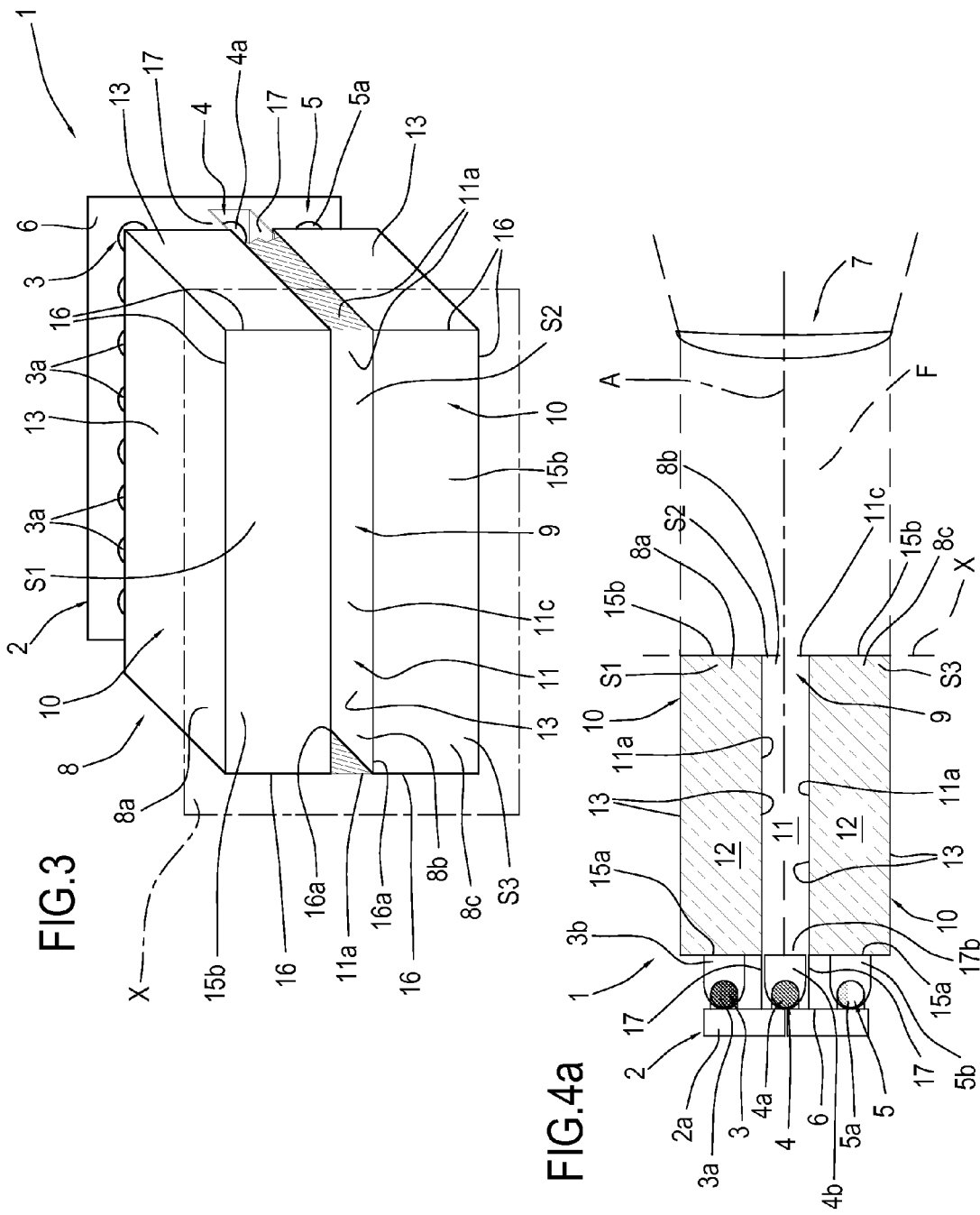

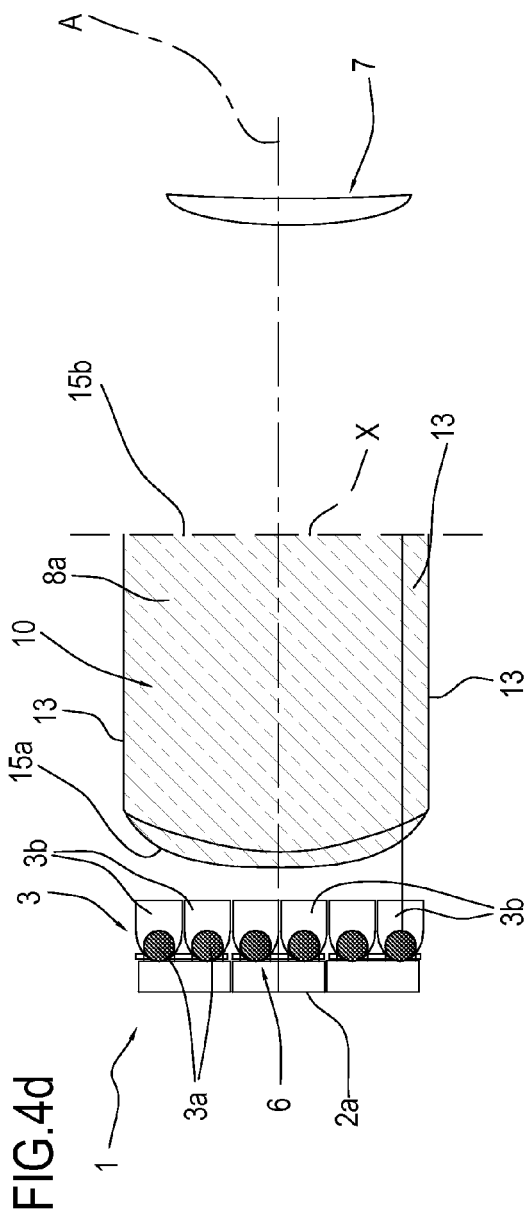
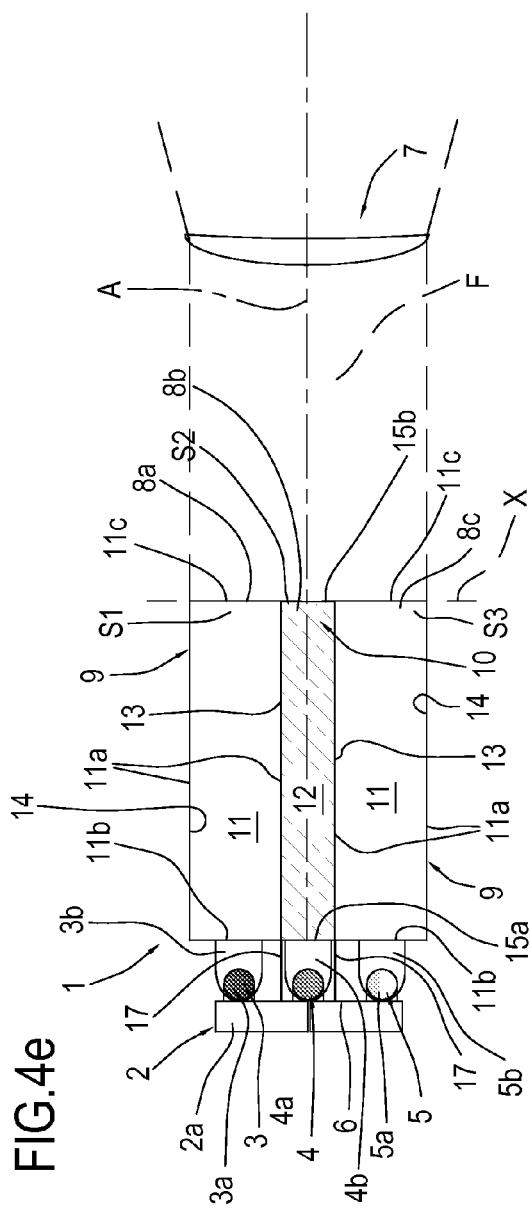

DEVICE FOR GENERATING A LIGHT BEAM WITH THREE OR MORE SECTORS FOR A GLIDE ANGLE INDICATOR FOR AIRCRAFT AND A GUIDE ANGLE INDICATOR COMPRISING THE DEVICE

This application claims priority to Italian Patent Application BO02012A000684 filed Dec. 18, 2012, the entirety of which is incorporated by reference herein.

BACKGROUND OF THE INVENTION

This invention relates to a device for generating a light beam with three or more sectors for a visual glide angle indicator for aircraft and a visual guide angle indicator comprising the device.

More specifically, this invention relates to an optical device which is able to project a beam of light forming a luminous path for guiding the aircraft, preferably helicopters, during landing, both on the ground and on fixed or floating marine platforms.

In the technical sector for aircraft guidance signalling, there are prior art luminous devices designed to indicate a predetermined guide angle to helicopters and aircraft, to allow the helicopters and aircraft to perform a correct manoeuvre for approaching the landing surface. In these applications, the light beam must be oriented both in azimuth and altitude so as to identify the desired landing path. In the applications on floating platforms, for example naval units, the light beam must also be stabilised relative to the movements of the platform induced by the wave motion of the sea. The stabilisation is performed relative to the rotary movements about the two axes: rolling, longitudinal to the axis of the platform, and pitching, at right angles to the axis of the platform.

The prior art devices have a light source, designed to produce a light beam which is transmitted by a suitable unit for creating the image.

Subsequently, the luminous image created is projected by an optical lens and directed in the predetermined direction, using a reflective element such as a suitably oriented mirror.

It should be noted that the projected image has a plurality of luminous sectors (more specifically, three) of different colours for guiding and providing a reference to the pilot during approach to the aircraft landing pad.

Currently, patent EP1547922, by the same Applicant, discloses a solution for the coupling of a LED light source with an optical fibre optical guide for forming an image to be projected. That solution, whilst it is technically valid, implies the need for an optical system comprising a sequence of collector lenses on the individual LED-optical fibre couplings, which are of special construction and expensive.

Alternatively, there is a prior art solution wherein the image is made using luminous devices creating luminous surfaces, the making of which is however currently difficult due to the unavailability on the market of panels with an adequate output.

However, patent EP2261122 proposes a solution diametrically opposite those just described. In effect, this solution provides for the use of a laser light source with a system for making the luminous sectors which is completely different from the previous solutions.

Disadvantageously, the use of the laser raises problems regarding its flexibility, as well as regarding the colours of the light beam. Moreover, the high speed, high precision pointing of the beam also raises a non-insignificant technical problem.

It is to be noted that, as disclosed in EP2495169, also in the neighbouring field of the production of Precision Approach Path Indicator (PAPI) it is known a solution which implies use of transparent solid blocks as guide for the light path. However, such a solution is similar to the one of EP2261122 and has the same disadvantages.

SUMMARY OF THE INVENTION

The aim of this invention is therefore to provide a device for generating images for a visual glide angle indicator for aircraft and a visual guide angle indicator for aircraft comprising the device that overcomes the above-mentioned drawbacks of the prior art.

More specifically, the aim of this invention is to provide a device for generating a light beam with three or more sectors for a visual glide angle indicator for aircraft which is high performing, inexpensive and easy to make.

Moreover, the aim of this invention is to provide a visual guide angle indicator for aircraft wherein the transition area between two adjacent chromatic sectors is sharp and immediate.

These aims are fully achieved by the device for generating a light beam with three or more sectors and by the visual guide angle indicator for aircraft according to this invention, comprising the features described in one or more of the claims.

BRIEF DESCRIPTION OF THE DRAWINGS

These features of the invention will become more apparent from the following detailed description of a preferred, non-limiting example embodiment of it, with reference to the accompanying drawings, in which:

FIG. 3 is a perspective view of a device for generating a light beam with three or more sectors according to this invention;

FIGS. 4a-4e are schematic views of different embodiments of a device for generating a light beam with three or more sectors for a visual glide angle indicator according to this invention.

DESCRIPTION OF THE PREFERRED EMBODIMENTS

Figure 1:
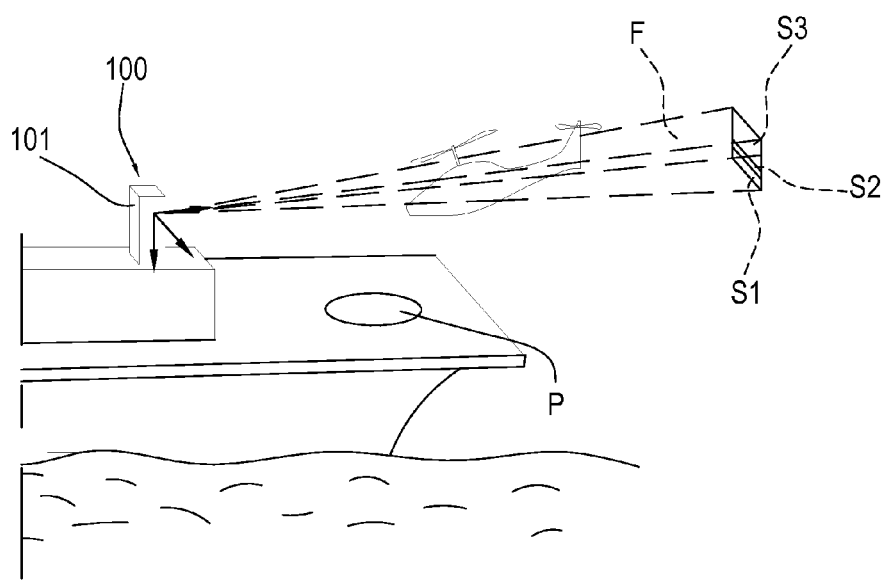
FIG. 1 is a schematic view of a visual guide angle indicator for aircraft according to this invention, during use.
Figure 2:
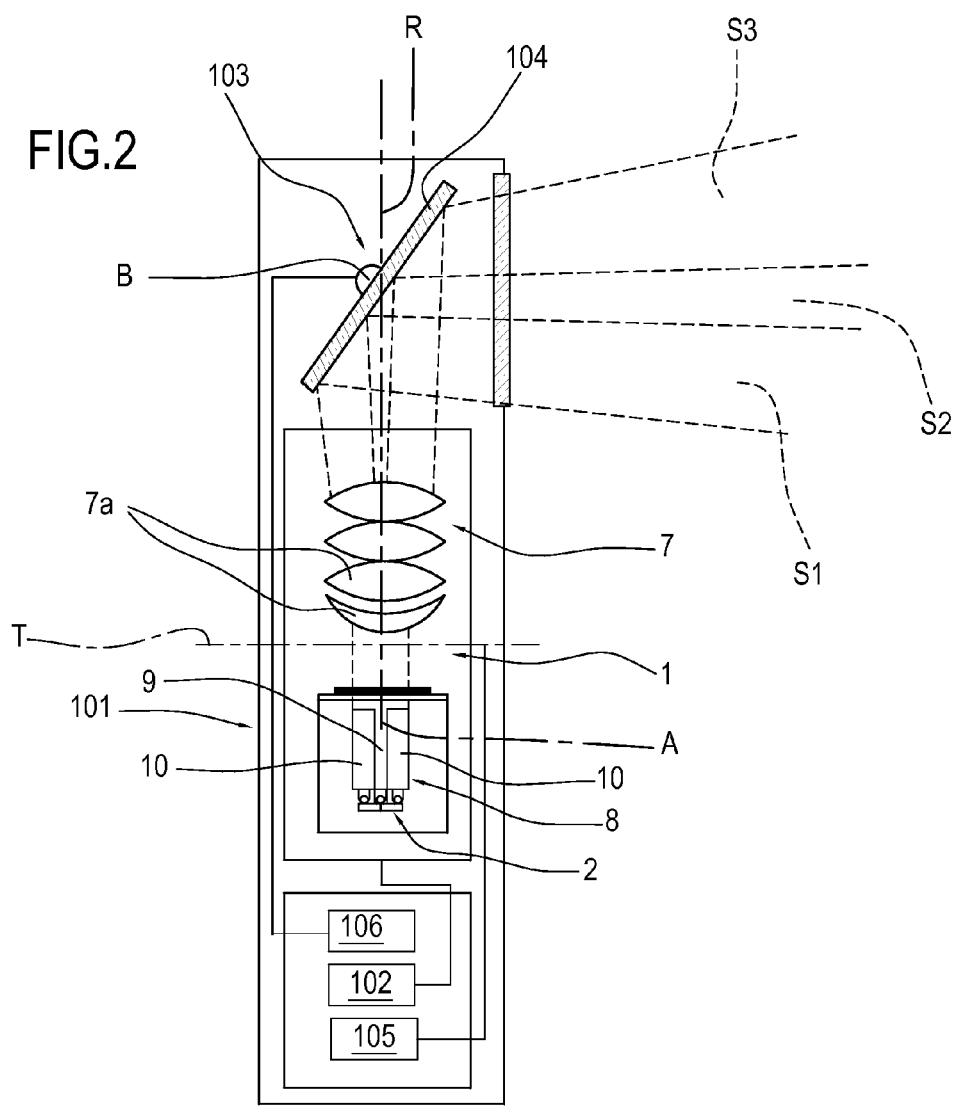
FIG. 2 is a schematic view of the visual indicator of FIG. 1 with some parts cut away to better illustrate others.

With reference to the accompanying drawings, the numeral 1 denotes a device for generating a light beam with three or more sectors for a visual glide angle indicator (or Glide Slope Indicator) 100 according to this invention.

The guide slope indicator 100 is located at pad "P", or helipad, for the landing of helicopters.

The pad "P" can be located on ground heliports, on off-shore platforms, on ships or elsewhere.

Firstly, the indicator 100 comprises a projector 101 of a light beam "F" which can be located close to the landing pad "P".

The projector 101 comprises the device 1 for generating a light beam with three or more sectors according to this invention, from which the light beam "F" is emitted, subdivided into a plurality of luminous sectors S1, S2, S3.

The indicator 100 also comprises at least one motor 102 connected to the projector 101 to set the latter in rotation about its own axis "R" so as to vary the orientation of the light beam "F".

Preferably, the indicator 100 comprises two motors 102, 105 connected to the projector 101 to set the latter in rotation about its own axis "R" so as to vary the orientation of the light beam "F" and at an axis "T" at right angles to the axis "R" and oriented along the direction of pointing towards the helicopter.

Preferably, the axis "R" is substantially vertical, that is, at right angles to the surface of the pad P.

In that way, the light beam "F" can be directed in any angular direction of azimuth and can be oriented angularly about the axis "T" for compensating any sloping of the pad P in such a way as to keep the beams S1, S2, S3 horizontal.

The motors 102 and 105 can be of the electrical or mechanical type.

Moreover, preferably, the indicator 100 comprises means of varying the inclination 103 of the light beam "F" relative to the axis "R".

The means of varying the inclination 103 preferably comprise a mirror 104 located downstream of the device 1 for generating a light beam with three or more sectors, along a direction "A" of propagation of the light beam.

Moreover, there is a motor 106 for moving the mirror 104.

The mirror 104 is preferably rotatable about an axis "B" transversal to the direction of propagation "A" in such a way as to vary the inclination of the light beam "F".

In the preferred embodiment, the mirror 104 is equipped with at least one rotation pin 104a positioned in such a way that the axis "B" passes through a centre of the mirror 104 and is substantially horizontal (that is, parallel to the ground).

In that way, a rotation of the mirror 104 about its axis "B" varies the inclination of the light beam "F" relative to the horizontal.

Preferably, the mirror 104 in use has an inclination such that the light beam "F" forms an acute angle with the surface of the pad "P" (that is, with the horizontal). That angle corresponds substantially with an approach angle of the helicopter.

In other words, the light beam 3 is inclined in order to rise, starting from the projector 2 away from the ground.

However, alternatively, the projector 101 may not have the mirror 104 and have a substantially horizontal orientation (that is, parallel to the plane of the pad), the entire projection unit 1 being rotated relative to an axis parallel to the axis "B".

In that case (not illustrated), the means for varying the inclination of the light beam "F" relative to the axis "B" comprise an actuator device operating on the projector for varying the inclination, orienting it in altitude relative to the above-mentioned axis parallel to the axis "B".

Thus, the device 1 for generating a light beam with three or more sectors is designed for generating a light beam "F" subdivided in horizontal sectors, so as to show to the pilot its direction of descent relative to the reference beam.

Preferably, these horizontal sectors comprise:
- at least one first end sector S1 having light (flashing or continuous), preferably red in colour, and/or
- at least one second end sector S3 having light (flashing or continuous), preferably yellow or green in colour, and/or
- at least one central sector S2 having light (flashing or continuous), preferably green or yellow in colour.

The pilot must, in order to be at the correct approach altitude, follow a path which allows him/her to remain in the central reference sector 52. The central sector S2 is typically green in colour but it may also be yellow in certain cases.

Other solutions also comprise infra-red (IR) LEDs so as to be able to control the IR component part in the light emitted and therefore be optimum for the use of Night Vision Goggles commonly used by military helicopter pilots.

According to this invention, the device 1 for generating a light beam with three or more sectors comprises illumination means 2 equipped with at least a first 3, a second 4 and a third LED source 5. Each of the LED sources 3, 4, 5 has different colours so as to determine the colouring of the sectors S1, S2, S3 of the light beam "F". Alternatively, the LED sources 3, 4, 5 could be programmed so as to provide light with different intensities and/or timing, that is, with steady or flashing light. The flashing light with different frequencies allows the pilot to recognise the light beams using night goggles, which would not allow the colours to be recognised.

Thus, the illumination means 2 are of the LED type and have at least three types of different LED sources, preferably by colour, but alternatively also by other parameters.

Preferably, each LED or group of LEDs faces a system of secondary lenses 3b, 4b, 5b, which are interposed relative to the propagation of the light beam and which have the purpose of concentrating the light along the path of propagation.

In other words, each LED or group of LED faces its relative secondary lenses 3b, 4b, 5b.

In the embodiment illustrated, the first LED source 3 illuminates the first end sector S1, the second LED source 4 illuminates the central sector S2 and the third LED source 5 illuminates the second end sector S3.

In the preferred embodiment, each LED source 3, 4, 5 comprises respectively a plurality of first 3a, second 4a and third LEDs 5a occupying respective areas adjacent to each other.

More specifically, the first LEDs 3a, the second LEDs 4a and the third LEDs 5a are positioned in strings or arrays adjacent to each other.

Preferably, the illumination means 2 comprise a flat support 6 on which LED sources 3, 4, 5 are positioned.

In the embodiment illustrated, the first 3a, second 4a and third LEDs 5a are coplanar with each other, positioned on the flat support 6 (preferably a printed circuit).

Thus, the light beam "F" propagates away from the flat support 6. In other words, the direction of propagation "A" of the light beam "F" is transversal (preferably orthogonal) to the flat support 6.

Moreover, the illumination means 2 comprise a dissipater 2a associated with the LED sources and connected to the flat support 6, on a face opposite to that from which the LED 3a, 4a, 5a protrude.

The generating device 1 also comprises a projection lens 7 aligned with the illumination means 2 along the direction of propagation "A" of the light beam "F".

The projection lens 7 comprises at least one lens 7a designed to project at a distance the image produced by the illumination means 2 on a projection surface "X" transversal to the optical axis of the lens 7 at a certain distance from it. The projection surface "X" is typically positioned in relation to the focal distance of the lens 7.

In the embodiment illustrated, the projection lens 7 comprises a plurality of lenses 7a aligned with each other to project the image in the form of a light beam having predetermined optical focusing and angular opening characteristics.

Moreover, according to this invention, the device 1 comprises an optical guide unit 8 interposed between the illumination means 2 and the projection lens 7.

The guide unit 8 is designed for capturing the light emitted by the illumination means 2 creating, on the projection surface X, the luminous image to be projected and, thus, the light beam "F".

The optical guide unit 8 extends away from the illumination means 2 along the direction of propagation "A". Thus, the optical guide unit 8 extends away from the flat support 6, preferably at right angles to it.

In other words, it is the optical guide unit 8 to determine the orientation of the direction of propagation "A".

Preferably, the optical guide unit 8 faces the LED sources 3, 4, 5 (more specifically, the secondary lenses 3b, 4b, 5b) and extends away from them along the direction of propagation "A", for generating at least the three different sectors S1, S2, S3 of the light beam "F".

Preferably, the optical guide unit 8 comprises at least three optical guides 8a, 8b, 8c, each facing a respective LED source 3, 4, 5 and extending away from them.

Thus, the optical guides 8a, 8b, 8c face the first 3, the second 4 and the third LED source 5 (more specifically, the secondary lenses 3b, 4b, 5b) and determine the extension of the sectors S1, S2, S3 of the light beam "F".

Preferably, the three optical guides 8a, 8b, 8c extend parallel to each other and are positioned alongside each other along a direction transversal (orthogonal) to the direction of propagation "A". It should be noted that the direction of extension of each optical guide 8a, 8b, 8c corresponds to the direction of propagation "A".

Consequently, the optical guide unit 8 comprises a central optical guide 8b, defining the central sector S2, interposed between two peripheral optical guides 8b, 8c, defining, respectively, the first S1 and the second S3 end sector.

In the embodiments illustrated, each optical guide 8a, 8b, 8c has a length "L" measured parallel to the direction of propagation "A". It should be noted that the increase of the length "L" improves the uniformity of light intensity on the projection surface "X" which faces the optical unit 7. On the other hand, the length "L" must be dimensioned on the basis of the available spaces.

According to this invention, the optical guide unit 8 comprises at least two different types of optical guide.

More specifically, the optical guide unit 8 comprises at least a first type of guide, or first guide 9, at least partly defined by a gaseous volume 11 and a second type of guide, or second guide 10, defined by a solid body 12 both permeable to the light of the respective LEDs 3, 4, 5 and extending away from them along the direction of propagation "A".

Hereinafter, reference will be made to first guide 9 and second guide 10 instead of first type of guide and second type of guide.

According to this invention, the generating device 1 comprises a first guide 9 interposed between two second guides 10 or vice versa.

In other words, the invention comprises an alternation between first 9 and second guides 10. Consequently, two LED sources 3, 4, 5 adjacent to each other face a first 9 and a second guide 10, respectively.

More specifically, in a first embodiment (FIGS. 2, 3, 4a-4d), the optical guide unit 8 comprises a single first guide 9 interposed between two second guides 10. Thus, the first guide 9 faces the second LED 4 (or the second string or array of LEDs) and the second guides 10 face, respectively, the first 3 and the third LED 5 (or the first and third string or array of LEDs).

In other words, the first guide 9 corresponds to the central optical guide 8b whilst the two second guides 10 correspond to the two peripheral optical guides 8a, 8c.

In a second embodiment (FIG. 4e), the optical guide unit 8 comprises a single second guide 10 interposed between two first guides 9. Thus, in that embodiment, the second guide 10 faces the second LED 4 (or the second string or array of LEDs) and the first guides 9 face, respectively, the first 3 and the third LED 5 (or the first and third string or array of LEDs). In other words, the second guide 10 corresponds to the central optical guide 8c whilst the two first guides 9 correspond to the two peripheral optical guides 8a, 8c.

Advantageously, in that way the sectors S1, S2 and S3 of the light beam "F" are clearly separated since the only separating partition between the solid body 12 and the gaseous volume 11 is a peripheral wall of the solid body 12.

More specifically, the solid body 12 has at least an inlet face 15a facing the respective LED source 3, 4, 5 and an outlet face 15b (opposite the inlet face 15a) facing the projection lens 7, wherein the outlet face 15b comprises at least one edge 16a adjacent to the first guide 9 and lying on the projection surface "X".

Preferably, the edge 16a adjacent to the first guide 9 is a sharp edge.

Advantageously, the separation line between two adjacent surfaces which form the image on the projection surface "X" comprises the edge formed between the front wall and a peripheral wall of the solid body 12.

Moreover, it should be noted that the making of a guide using a substantially "empty" volume allows the costs for production and manufacturing of the device to be considerably reduced.

As indicated, each first guide 9 is at least party defined by a gaseous volume permeable to the light of the respective LEDs 3, 4, 5.

Preferably, the gaseous volume 11 is a volume of air. This description will continue with specific reference to the volume of air 11 instead of the gaseous volume 11, so as to remain more in line with the example shown in the drawings but without limiting the scope of the invention.

In the preferred embodiment, the first guide 9 is defined by a volume of air 11 extending for the entire length "L".

Thus, the first guide 9 is completely defined (at least in its length) by the volume of air 11.

Thus, the first guide 9 is substantially a free volume at least partly delimited laterally by a plurality of walls 11a.

In the preferred embodiment, the walls 11a are opaque or reflective, so as to limit the section of emission of the respective sector of the light beam "F".

In other words, the presence of the opaque or reflective walls 11a prevents the passage, from the first guide 9 to the second guide 10, of the light emitted by a LED source 3, 4, 5.

There are at least two lateral walls 11a, one adjacent to the second guide 10 and one facing it.

Figure 4B:
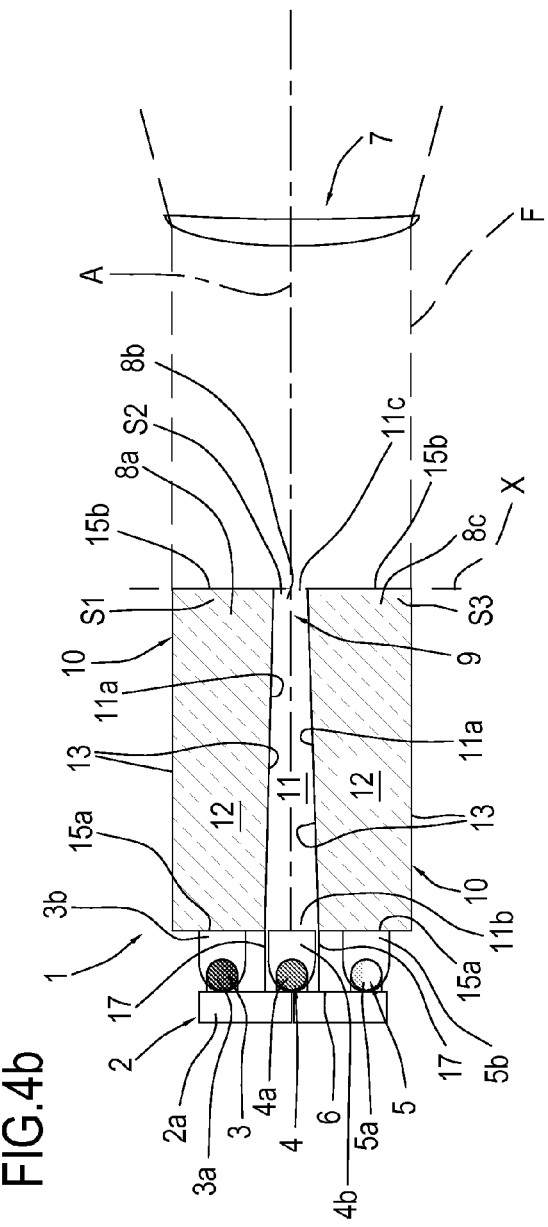
Figure 4C:
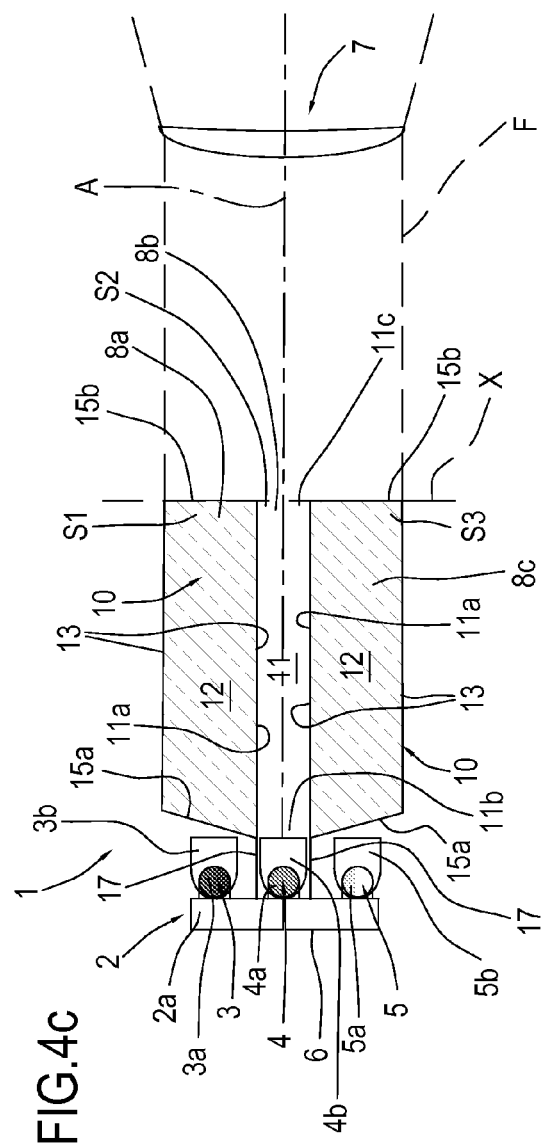

Thus, in at least one embodiment, the first guide is simply defined by a volume of air interposed between two second guides 10 (FIGS. 4a-4d) or by a volume of air interposed between a first guide and a separating partition (FIG. 4e).

In the preferred embodiment, the volume of air 11 is substantially a prismatic volume, delimited by the plurality of lateral walls 11a (preferably four).

Thus, the first guide 9 is substantially a free tubular conduit extending from an inlet section 11b, facing the respective LED source 3, 4, 5, to an outlet section 11c, facing the projection lens 7.

It should be noted that at least one of the lateral walls 11a delimiting the volume of air 11 is defined by a lateral face 13 of the solid body 12 defining the second guide 10.

More specifically, the lateral walls 11a delimiting the volume of air 11 adjacent to a second guide 10 are defined by a lateral face 13 of the solid body 12 defining the second guide 10.

Thus, the lateral face 13 of the solid body is coated with an opaque or reflective material or treated in such a way as to be opaque or reflective.

On the other hand, the remaining lateral walls 11a are defined by respective separating partitions 14, also preferably opaque or reflective.

In other words, the separating walls between two adjacent guides are defined by respective lateral faces 13 of one or more solid bodies 12, whilst the remaining lateral walls 11a are defined by their own separating partitions 14.

Advantageously, in this way the line of separation between the light beam of the first guide 9 and that of the second guide 10 is clear, free of blurred or opaque transition areas.

Thus, in the embodiment shown in FIGS. 2, 3, 4a-4d, wherein the first guide 9 is interposed between two second guides 10, there are two lateral walls 11a defined by faces of the solid bodies 12.

On the other hand, in the embodiment shown in FIG. 4e, wherein the second guide 10 is interposed between two first guides 9, each first guide 9 has a single lateral wall 11a defined by a face of the single solid body 12. This embodiment has the advantage of having the optical unit 8 made with a minimum of material and also eliminating problems of alignment between the edges of the guides during manufacturing, since the two lines of separation of the beams are in effect made from the edges of the single solid guide 12.

In the preferred embodiment, the solid body 12 is defined by a solid block (with a substantially prismatic shape) made of material transparent to light.

In a first embodiment, the material is free of colouring (and the LEDs are coloured).

Alternatively, the solid body 12 could be made from coloured material, using respective white LEDs.

Preferably, the solid body is made from Plexiglas (PMMA) or polycarbonate. However, alternatively, the solid body could be made from glass or the like.

In this regard, it should be noted that the solid body 12 of each second guide 10 is defined by an element with a polygonal cross-section extending longitudinally along the direction of propagation "A".

Thus, the solid body 12 comprises a plurality of lateral faces 13 (each defining a side of the polygon).

At least one of the faces 13 is adjacent to the first guide 9 for delimiting it (that is, for laterally delimiting the volume of air 11). In other words, according to the above description, the face 13 defines a lateral wall 11a of the volume of air 11.

In the preferred embodiment, the solid body 12 is a prism with six faces, having the inlet face 15a facing the respective LED source 3, 4, 5, the outlet face 15b opposite the inlet face 15a and facing the projection lens 7 and four lateral faces 13 which delimit it perimetrally.

As stated previously, the outlet face 15b of the solid body 12 of each second guide 10 is defined by a plurality of edges 16, 16a, corresponding in number to the number of sides of the polygon. In the preferred embodiment there are four edges 16, 16a.

It should be noted that at least the separating edges 16a adjacent to the first guide 9 are sharp edges. In the embodiment illustrated, all four edges 16, 16a are sharp edges.

Preferably, the sharp edges 16 have a radius of curvature less than 0.5 mm. Advantageously, this reduces the transition area between the adjacent sectors S1, S2, S3 of the light beam "F".

It should be noted that only these must be aligned with the surface X (in effect, the surfaces of the prisms could also be inclined relative to a plane) since at least these must be projected in a precise manner (in focus) so as to reduce the transition area between the luminous sectors S1, S2 and S3.

It should be noted that, in a first embodiment, the inlet face 15a of the solid body 12 faces the respective LED sources 3, 4, 5 and is orthogonal to the direction of propagation "A". Thus, the inlet face 15a is substantially parallel to the flat support 6. It should be noted that, in this embodiment, the inlet face 15a and the outlet face 15b are parallel to each other.

Alternatively, the inlet face 15a can be inclined relative to the flat support 6 by an angle of between 0 and 15 degrees, so as to direct the light beam "F" on the projection lens 7 in a more correct fashion.

Moreover, the inlet face 15a could also not be flat and have a curved shape, in such a way as to converge the light beam "F" on the projection lens 7. Thus, in that embodiment, the first face 15a has a concavity facing away from the respective LED source 3, 4, 5.

In the preferred embodiment, the optical guides 9, 10 have a substantially constant cross-section along the entire length "L".

Thus, both the volume of air 11 and the solid body 12 can be likened to prisms with a constant cross-section.

However, alternatively, according to the embodiment illustrated in FIG. 4b, the central optical guide 8b (which can be a first guide 9 or a second guide 10, according to the embodiment) has a convergent extension. In other words, the central optical guide 8b has an inlet section 11b (or inlet face 15a) with an extension greater than that of the outlet section 11c (or outlet face 15b). Thus, the peripheral optical guides 8a, 8c, between which is interposed the central optical guide 8b, have a diverging extension or they are inclined in a complementary fashion relative to the central optical guide 8b.

In that way it is possible to vary the dimension of the central sector S2 of the light beam "F" relative to the two end sectors S1, S3.

Preferably, moreover, the LED source facing the central optical guide 8b (that is, the second LED source 4) is separated from the first 3 and from the third LED source 5 by two separating partitions 17 extending from opposite sides of the (second) LED source 4, towards the optical guide unit 8 for channelling the light emitted by the (second) LED source 4 in the central optical guide 8b.

More specifically, the separating partitions 17 extend from opposite sides of the second LED source 4 starting from the flat support 6, protruding from it, towards the central optical guide 8b.

Thus, the separating partitions 17 have a free end 17a facing and proximal to the inlet face 15a of the solid body 12 or to the inlet section 11b of the gaseous volume 11, according to the embodiment.

In order to limit the light dispersion, the separating partitions 17 are also made from or coated with opaque or reflective material.

The invention achieves the preset aims and brings important advantages.

In effect, the fact of making the line of separation by means of the edge of a single prism allows a clear separation line between two adjacent sectors of the light beam.

Moreover, making the edge of the outlet face of the solid body with a minimum curvature further reduces the transition area between the light beams.

The embodiment with a single solid guide also eliminates problems of alignment between the solid prisms during manufacturing.

Moreover, by making the optical guide unit with only two solid guides and an air guide or, better still, vice versa, the production costs of the device and of the indicator in general are considerably reduced.

It should be noted that the presence of an optical guide defined simply by free volume increase the reliability of the system since it reduces the number of elements with the possibility of defects or wear and the need to align them optically with precision.

What is claimed is:

1. A generating device for generating a light beam with three or more sectors for a glide angle indicator for aircraft, comprising:
    illumination means including at least a first LED source, a second LED source and a third LED source;
    a projection lens aligned with the illumination means along a direction of propagation of a light beam;
    an optical guide unit interposed between the illumination means and the projection lens, facing the first, second and third LED sources and extending away from the first second and third LED sources along the direction of propagation, for generating an image comprising at least three different sectors of the light beam; wherein the optical guide unit comprises at least a first guide at least partly defined by a gaseous volume and a second guide defined by a solid body, both the first guide and the second guide facing a respective one of the first, second and third LED sources permeable to the light and extending away from the respective one of the first, second and third LED sources along the direction of propagation,
    at least one chosen from the following arrangements:
        wherein the optical guide unit comprises two second guides, each defined by a solid body, wherein the first guide is interposed between the two second guides; and
        wherein the optical guide unit comprises two first guides, each at least partly defined by a gaseous volume, wherein the second guide is interposed between the two first guides.

2. The generating device according to claim 1, wherein each first guide and second guide has a length "L" measured parallel to the direction of propagation; wherein the gaseous volume of each first guide extends for the entire length "L".

3. The generating device according to claim 1, wherein the gaseous volume is a volume of air.

4. The generating device according claim 1, wherein the gaseous volume is at least partly delimited laterally by a plurality of opaque or reflective lateral walls, to limit a section of a respective one of the sectors of the light beam.

5. The generating device according to claim 1, wherein the projection lens defines a projection surface positioned at a focal distance from the projection lens; the solid body of each second guide having at least an inlet face facing the respective one of the first, second and third LED sources, an outlet face opposite the inlet face and facing the projection lens, and wherein the outlet face comprises at least one edge adjacent to the first guide and lying on the projection surface.

6. The generating device according to claim 5, wherein the outlet face of the solid body of each second guide is delimited by at least four edges; each separating edge between the second guide and the adjacent first guide being a sharp edge.

7. The generating device according to claim 1, wherein the solid body of each second guide is defined by a solid block with a substantially prismatic shape made of material transparent to light.

8. The generating device according to claim 5, wherein the solid body of each second guide is defined by a prism with six faces including an inlet face and an outlet face connected by four lateral faces which perimetrally delimit the solid body.

9. The generating device according to claim 1, wherein the solid body of each second guide has at least one lateral face adjacent to the first guide; the at least one lateral face being coated with an opaque or reflective material or treated to be opaque or reflective, for defining a lateral wall delimiting at least in part the gaseous volume.

10. The generating device according to claim 1, wherein the second LED source is separated from the first LED source and from the third LED source by two separating partitions extending from opposite sides of the second LED source, towards the optical guide unit for channeling the light emitted by the second LED source in the respective optical guide.

11. A visual glide indicator for aircraft, comprising:
    a projector of a light beam including the generating device according to claim 1 and installable in a vicinity of a helicopter landing pad;
    a motor connected to the projector to set the projector in rotation about an axis of the projector substantially at right angles to the landing pad so as to vary an orientation of the light beam.

12. The visual glide indicator according to claim 11, comprising means for varying the inclination of the light beam relative to the axis.

13. The visual glide indicator according to claim 12, wherein the means for varying the inclination comprise a mirror located downstream of the generating device along the direction of propagation and rotatable about an axis transversal to the direction of propagation, in such a way as to vary the inclination of the light beam.

14. The generating device according to claim 1, wherein the optical guide unit comprises the two second guides, each defined by the solid body, wherein the first guide is interposed between the two second guides.

15. The generating device according to claim 1, wherein the optical guide unit comprises the two first guides, each at least partly defined by the gaseous volume, wherein the second guide is interposed between the two first guides.

* * * * *